United States Patent
Asahi et al.

(10) Patent No.: US 10,651,701 B2
(45) Date of Patent: May 12, 2020

(54) MOTOR, MOTOR PRODUCTION METHOD, AND STATOR UNIT

(71) Applicant: Nidec Corporation, Minami-ku, Kyoto (JP)

(72) Inventors: Yu Asahi, Kyoto (JP); Hidehiro Haga, Kyoto (JP); Shunsuke Murakami, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 75 days.

(21) Appl. No.: 15/751,490

(22) PCT Filed: Aug. 8, 2016

(86) PCT No.: PCT/JP2016/073266
§ 371 (c)(1),
(2) Date: Feb. 9, 2018

(87) PCT Pub. No.: WO2017/026436
PCT Pub. Date: Feb. 16, 2017

(65) Prior Publication Data
US 2018/0241268 A1    Aug. 23, 2018

(30) Foreign Application Priority Data
Aug. 10, 2015    (JP) .................. 2015-158392

(51) Int. Cl.
*H02K 3/18*    (2006.01)
*H02K 3/52*    (2006.01)
(Continued)

(52) U.S. Cl.
CPC .................. *H02K 3/18* (2013.01); *H02K 3/28* (2013.01); *H02K 3/46* (2013.01); *H02K 3/522* (2013.01);
(Continued)

(58) Field of Classification Search
CPC ............ H02K 3/18; H02K 3/50; H02K 3/522; H02K 2203/06; H02K 2203/09; H02K 2203/12
See application file for complete search history.

(56) References Cited

U.S. PATENT DOCUMENTS 897,166 A * 8/1908 Shurtleff .................. H02P 23/24
318/754
2,235,075 A * 3/1941 Kimball .................. H02K 23/42
310/186
(Continued)

FOREIGN PATENT DOCUMENTS

JP    S62119140 U    7/1987
JP    2011259614 A    12/2011
(Continued)

*Primary Examiner* — Dang D Le
(74) *Attorney, Agent, or Firm* — Viering, Jentschura & Partner MBB

(57) ABSTRACT

A motor includes a rotor having a shaft disposed along a central axis extending in a vertical direction; and a stator opposed to the rotor in a radial direction with a gap therebetween. The stator includes: an annular core back extending in a circumferential direction; a plurality of teeth extending from the core back in the radial direction; a plurality of coils formed of a conductive wire wound around the teeth, the coils forming a plurality of connection systems; and an insulator, at least part of which is positioned between the teeth and the coils. The coils include: a first coil wound around the teeth via the insulator; and a second coil wound around the teeth via the first coil and the insulator.

15 Claims, 10 Drawing Sheets

(51) Int. Cl.
*H02K 3/28* (2006.01)
*H02K 3/46* (2006.01)
*H02K 15/095* (2006.01)

(52) U.S. Cl.
CPC ....... *H02K 15/095* (2013.01); *H02K 2203/09* (2013.01)

(56) References Cited

U.S. PATENT DOCUMENTS

| | | | | |
|---|---|---|---|---|
| 3,497,740 | A | * | 2/1970 | Gerke .............. H02K 3/18 310/187 |
| 4,967,464 | A | * | 11/1990 | Stephens .......... H02K 3/18 29/596 |
| 6,664,677 | B2 | | 12/2003 | Tanaka et al. |
| 6,914,356 | B2 | * | 7/2005 | Yamamura ........ H02K 3/50 310/71 |
| 7,365,468 | B2 | * | 4/2008 | Rahman ............ H02K 3/18 29/605 |
| 7,557,478 | B2 | * | 7/2009 | Hoshika ............ H02K 3/522 310/180 |
| 8,013,490 | B2 | * | 9/2011 | Hino ................. H02K 3/34 310/194 |
| 8,729,754 | B2 | * | 5/2014 | Fujii ................. H02K 3/522 310/68 B |
| 2007/0247014 | A1 | * | 10/2007 | Schach ............. H02K 23/02 310/184 |
| 2009/0026870 | A1 | * | 1/2009 | Hoshino ........... H02K 3/522 310/194 |
| 2011/0241472 | A1 | | 10/2011 | Tanaka et al. |

FOREIGN PATENT DOCUMENTS

| | | |
|---|---|---|
| JP | 2013031331 A | 2/2013 |
| JP | 2014075907 A | 4/2014 |
| JP | 2015133892 A | 7/2015 |

* cited by examiner

ID_2335
MOTOR, MOTOR PRODUCTION METHOD, AND STATOR UNIT

RELATED APPLICATIONS

The present application is a national stage entry according to 35 U.S.C. § 371 of PCT application No.: PCT/JP2016/073266 filed on Aug. 8, 2016, which claims priority from Japanese application No.: 2015-158392 filed on Aug. 10, 2015, is incorporated herein by reference in its entirety.

FIELD OF THE INVENTION

The present disclosure relates to a motor, manufacturing method of motor, and stator unit.

DESCRIPTION OF THE RELATED ART

Conventionally, a coiling method of drawing two draw lines from one stator core is known (for example, JP 2002-84723 A and so on).

As a connection system to supply power to a stator, a motor including a plurality of connection systems is used. In such a motor with a stator coil of the above-mentioned method, two conductors drawn as a winding end of the stator coil may possibly be confused and connected to wrong busbars. Thus, there is a technical difficulty in properly forming a plurality of connection systems.

SUMMARY OF THE INVENTION

According to the present disclosure, a motor includes a rotor including a shaft disposed along a central axis extending in a vertical direction; and a stator opposed to the rotor in a radial direction with a gap therebetween, wherein the stator includes: an annular core back extending in a circumferential direction; a plurality of teeth extending from the core back in the radial direction; a plurality of coils formed of a conductive wire wound around the teeth, the coils forming a plurality of connection systems; and an insulator, at least part of which is positioned between the teeth and the coils, and wherein the coils include: a first coil wound around the teeth via the insulator; and a second coil wound around the teeth via the first coil and the insulator.

According to the present disclosure, a manufacturing method of a motor including: a rotor including a shaft disposed along a central axis extending in a vertical direction; a stator opposed to the rotor in a radial direction with a gap therebetween; and a plurality of busbars electrically connected to the stator, wherein the stator includes: an annular core back extending in a circumferential direction; a plurality of teeth extending from the core back in the radial direction; a plurality of coils formed of a conductive wire wound around the teeth, the coils forming a plurality of connection systems; and an insulator, at least part of which is positioned between the teeth and the coils, and wherein a first coil group including the coils, and a second coil group including the coils, the first coil group and the second coil group forming different connection systems, and wherein the busbars include a first busbar electrically connected to the first coil group, and a second busbar electrically connected to the second coil group, the method includes, in at least one of the teeth: a step S1 of forming a first coil winding the conductive wire around the teeth; a step S2 of hooking the conductive wire wound at the end of the first coil on the insulator to form a lead line; and a step S3 of winding the conductive wire which is the same as the first coil and the lead wire over the first coil to form a second coil.

According to the present disclosure, a stator unit includes a motor including a rotor with a shaft disposed along a central axis extending in a vertical direction, the stator unit comprising: a stator opposed to the rotor in a radial direction with a gap therebetween; and a plurality of busbars electrically connected to the stator, wherein the stator includes: an annular core back extending in a circumferential direction; a plurality of teeth extending from the core back in the radial direction; a plurality of coils formed of a conductive wire wound around the teeth, the coils forming a plurality of connection systems; and an insulator, at least part of which is positioned between the teeth and the coils, and wherein the coils include: a first coil including a coil end connected to the busbar and wound around the teeth via the insulator; and a second coil including a coil end connected to the busbar and wound around the teeth via the first coil and the insulator.

The above and other elements, features, steps, characteristics and advantages of the present discloser will become more apparent from the following detailed description of the preferred embodiments with reference to the attached drawings.

DETAILED DESCRIPTION OF THE PREFERRED EMBODIMENTS

Hereinafter, a motor of the preferred embodiment of the present disclosure will be described with reference to accompanying drawings. In the present application, the upper side of a central axis J extending in a vertical direction in FIG. 1 will be referred to as upper side, and the lower side thereof will be referred to as lower side. Note that the vertical direction does not indicate a positional relationship and a direction when the motor is incorporated in an actual device. Furthermore, a direction parallel with the central axis J will be referred to as axis direction, and a radial direction around the central axis J will be referred to as radial direction, and a circumferential direction around the central axis J will be referred to as circumferential direction.

In the present application, a phrase such as extending in an axis direction includes a case where a structural element extends in the axis direction, and a case where a structural element extends in a direction inclined at an angle less than 45 degree with respect to the axis direction. A phrase such as extending in a radial direction includes a case where a structural element extends in the radial direction, that is, a direction orthogonal to the axis direction, and a case where a structural element extends in a direction inclined at an angle less than 45 degree with respect to the radial direction.

Figure 1:
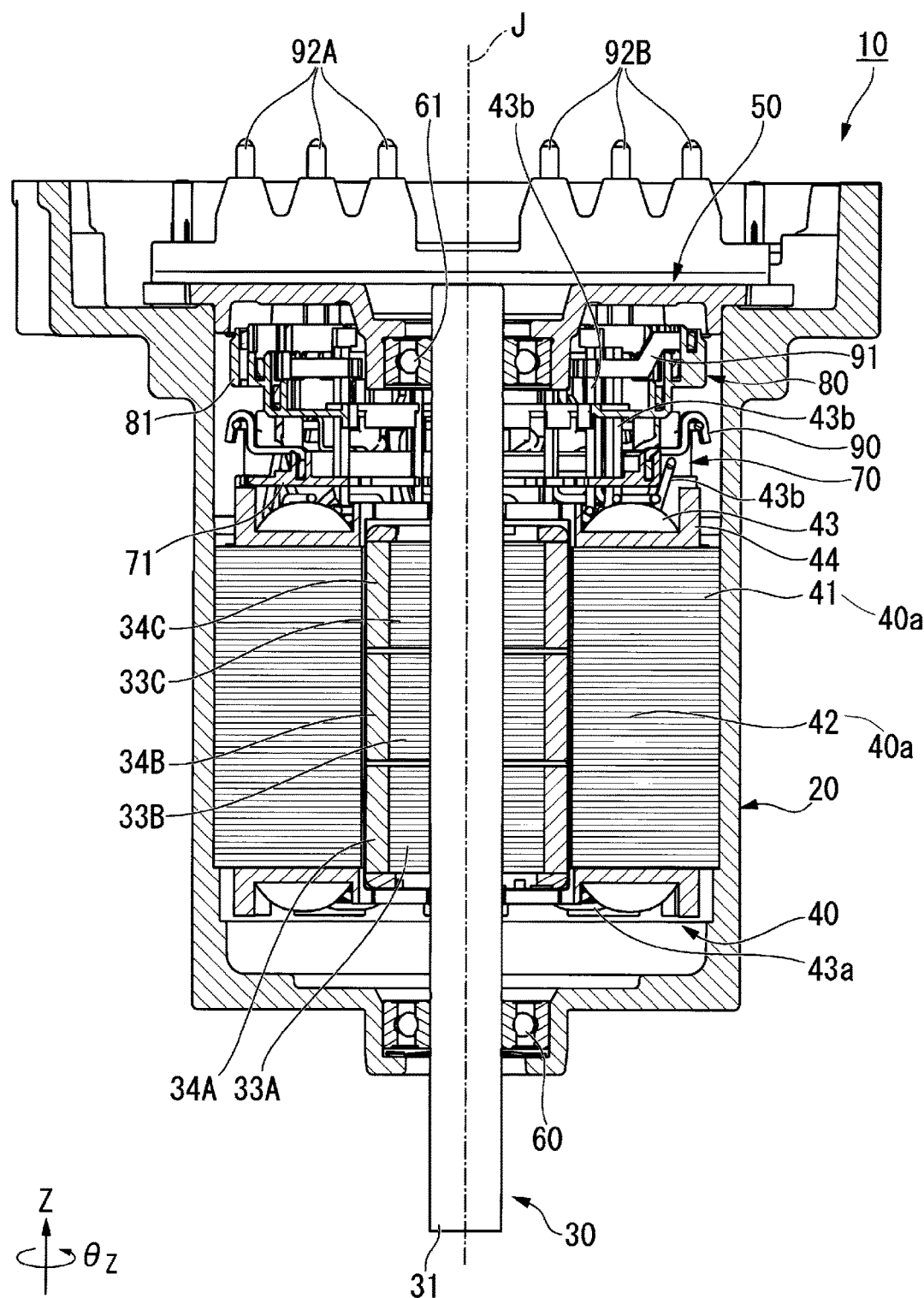
FIG. 1 is a cross-sectional view of a motor of a preferred embodiment.

As shown in FIG. 1, a motor 10 is, for example, an inner rotor motor. The motor 10 includes a housing 20 which can accommodate parts, rotor 30, annular stator 40, bearing holder 50, lower bearing 60 held by the housing 20, upper bearing 61 held by the bearing holder 50, lower side busbar assembly 70, upper side busbar assembly 80, and terminals 92A and 92B.

The rotor 30 includes a shaft 31 disposed along the central axis J, first rotor core 33A, second rotor core 33B, third rotor core 33C, first magnet 34A, second magnet 34B, and third magnet 34C. The shaft 31 is supported rotatably about the central axis J by the lower bearing 60 and the upper bearing 61. The rotor 30 is rotatable with respect to the stator 40 inside the stator 40.

The first core 33A, second rotor core 33B, and third rotor core 33C are annular. The first rotor core 33A, second rotor core 33B, and third rotor core 33C are arranged in this order from the lower side to the upper side in the axis direction. The inner side surfaces of the first rotor core 33A, second rotor core 33B, and third rotor core 33C are, for example, cylindrical around the central axis J. The first rotor core 33A, second rotor core 33B, and third rotor core 33C are fixed to the shaft 31 by, for example, press fitting. Note that the first rotor core 33A, second rotor core 33B, and third rotor core 33C may be indirectly fixed to the shaft 31 with another member.

The first magnet 34A, second magnet 34B, and third magnet 34C are, for example, formed in a plate extending in the circumferential direction. The first magnet 34A is fixed to the outer side surface of the first rotor core 33A. The second magnet 34B is fixed to the outer side surface of the second rotor core 33B. The third magnet 34C is fixed to the outer side surface of the third rotor core 33C.

A plurality of first magnets 34A, second magnets 34B, and third magnets 34C are provided along the circumferential direction. Note that the first magnet 34A, second magnet 34B, and third magnet 34C may be formed as a single member. In that case, the first magnet 34A, second magnet 34B, and third magnet 34C are, for example, cylindrical.

The stator 40 is opposed to the rotor 30 in the radial direction with a gap therebetween. The stator 40 is, for example, disposed outside the rotor 30 in the radial direction. The stator 40 includes a stator core 40a, a plurality of coils 43, and a plurality of insulators 44. The stator core 40a is, for example, a layered structure of a plurality of electromagnetic steel sheets. The stator core 40a includes an annular core back 41 extending in the circumferential direction and a plurality of teeth 42 extending in the radial direction from the core back 41. That is, the stator 40 includes the core back 41 and the teeth 42.

The core back 41 is, for example, a cylinder around the central axis J. The outer peripheral surface of the core back 41 is fixed to the inner peripheral surface of the housing 20 by, for example, press fitting. In the present embodiment, the teeth 42 extend inwardly in the radial direction from the inner side surface of the core back 41. The teeth 42 are arranged at regular intervals in the circumferential direction.

The coil 43 is formed of a conductive wire 43a wound around the teeth 42 with the insulator 44 interposed therebetween. The coil 43 is arranged on each of the teeth 42. The coil 43 includes a coil end 43b which is an end of the conductive wire 43a. The coil end 43b extends to the upper side from a position where the coil 43 is wound around the teeth 42. At least part of the insulator 44 is disposed between the teeth 42 and the coils 43. The insulator 44 covers at least part of the teeth 42.

The lower side busbar assembly 70 is substantially cylindrical. The lower side busbar assembly 70 is disposed above the stator 40. The lower side busbar assembly 70 includes a neutral point busbar 90 and a substantially cylindrical lower side busbar holder 71 which holds the neutral point busbar 90.

The lower side busbar holder 71 is formed of, for example, an insulative resin. The lower side busbar holder 71 is fixed to the insulator 44. The neutral point busbar 90 is electrically connected to the coil 43. Specifically, the neutral point busbar 90 is connected to the coil end 43b. Thus, the neutral point busbar 90 is electrically connected to the stator 40. The neutral point busbar 90 connects a plurality of coil ends 43b as a neutral point.

The upper side busbar assembly 80 is substantially cylindrical. The upper side busbar assembly 80 is disposed above the lower side busbar assembly 70. The upper side busbar assembly 80 includes a phase busbar 91 and an upper side busbar holder 81 holding the phase busbar 91. That is, the motor 10 includes the phase busbar 91 and the upper busbar holder 81.

The upper busbar holder 81 is substantially cylindrical and is formed of, for example, an insulative resin. The upper busbar holder 81 is fixed to the housing 20. The phase busbar 91 is electrically connected to the coil 43. Specifically, the phase busbar 91 is connected to the coil end 43b. The phase busbar 91 is connected to the terminals 92A and 92B. Thus, the phase busbar 91 is electrically connected to the stator 40.

The terminals 92A and 92B are plate-like members extending to the upper side. Ends of the terminals 92A and 92B in the upper side are disposed above the end of the housing 20 in the upper side. The terminals 92A and 92B are connected to an external power source which is not shown.

Figure 2:
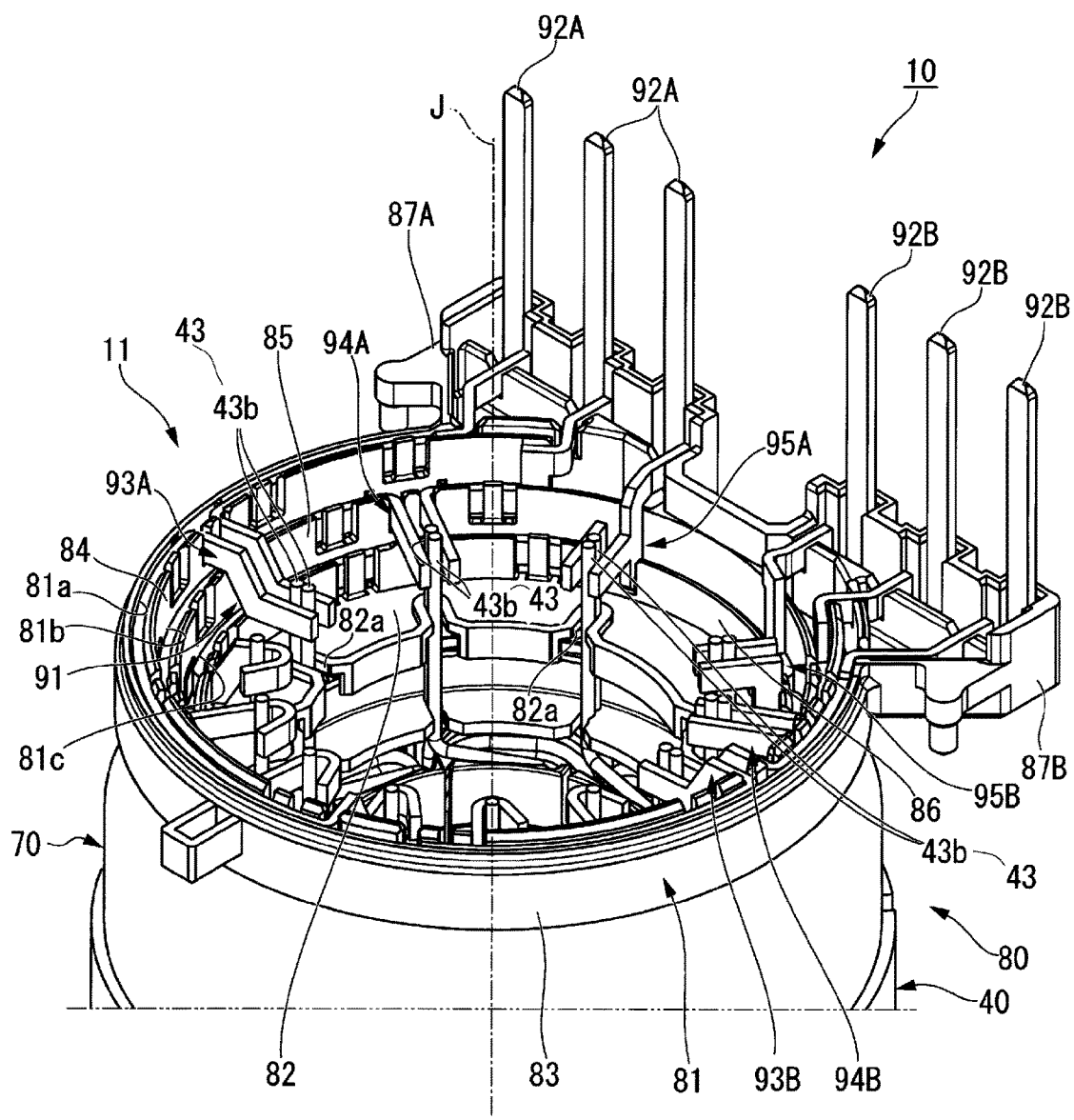
FIG. 2 is a perspective view of part of a stator unit of the preferred embodiment.

As shown in FIG. 2, in the present embodiment, a stator unit 11 includes the stator 40, upper side busbar assembly 80, and lower side busbar assembly 70. The stator unit 11 includes the phase busbar 91 of the upper side busbar assembly 80 and the neutral point busbar 90 of the lower side busbar assembly 70. Hereinafter, each part of the stator unit 11 will be described.

The upper side busbar holder 81 includes a second coil support 82 of substantially cylindrical shape, outer tube 83 of cylindrical shape, first peripheral wall 84, second peripheral wall 85, third peripheral wall 86, and terminal holders 87A and 87B. The motor 10 includes an insulative second coil support 82.

The outer tube 83 extends in the upper side from the outer edge of the second coil support 82. The first peripheral wall 84, second peripheral wall 85, and third peripheral wall 86 are positioned inwardly in the radial direction than the outer tube 83 and extend in the upper side from the second coil support 82. The terminal holders 87A and 87B protrude outwardly in the radial direction from the outer tube 83.

The central axis J passes through the center of the second coil support 82, for example. The second coil support 82 includes a second supporter 82a which supports the coil end 43b. The second coil support 82 is disposed between the neutral point busbar 90 and the phase busbar 91 in the axis direction. Thus, the neutral point busbar 90 and the phase busbar 91 can be divided in up and down sides with the second coil support 82 interposed therebetween. Thus, the coil end 43b can easily be disposed in a certain position.

The second supporter 82a is a recess depressed from the inner edge of the second coil support 82 to the outer side thereof in the radial direction. The coil end 43b passes inside the second supporter 82a. The coil end 43b is supported by the inner side surface of the second supporter 82a from the both sides in the circumferential direction.

The center of the outer tube 83 is the central axis J. The first peripheral wall 84, second peripheral wall 85, and third peripheral wall 86 extend in the circumferential direction. The first peripheral wall 84 has an arc-like shape in a plan view. The second peripheral wall 85 and the third peripheral wall 86 are cylindrical having the same center with the outer tube 83. The second peripheral wall 85 is positioned inwardly in the radial direction than is the first peripheral wall 84. The third peripheral wall 86 is positioned inwardly in the radial direction than is the second peripheral wall 85.

The upper side end of the first peripheral wall 84 is at the same position with the upper side end of the outer tube 83 in the axis direction. The upper side end of the second peripheral wall 85 is positioned below the upper side end of the first peripheral wall 84 in the axis direction. The upper side end of the third peripheral wall 86 is positioned below the upper side end of the second peripheral wall 85.

The upper side buster holder 81 includes a first groove 81a, second groove 81b, and third groove 81c depressed downwardly and extending in the circumferential direction. The first groove 81a is positioned between the outer tube 83 and the first peripheral wall 84 in the radial direction. The second groove 81b is positioned between the first peripheral wall 84 and the second peripheral wall 85 in the radial direction. The third groove 81c is positioned between the second peripheral wall 85 and the third peripheral wall 86 in the radial direction.

The bottom of the first groove 81a is positioned above the bottom of the second groove 81b in the axis direction. The bottom of the second groove 81b is positioned above the bottom of the third groove 81c in the axis direction.

The terminal holders 87A and 87B are substantially rectangular in a plan view. The terminal holder 87A holds the terminal 92A. The terminal holder 87B holds the terminal 92B.

As shown in FIG. 2, the phase busbar 91 includes first phase busbars 93A and 93B, second phase busbars 94A and 94B, and third phase busbars 95A and 95B. That is, the motor 10 includes a plurality of phase busbars 91.

The first phase busbars 93A and 93B are held in the first grove 81a. The second phase busbars 94A and 94B are held in the second groove 81b. The third phase busbars 95A and 95B are held in the third groove 81c.

The phase busbars 91 form a plurality of busbar groups of different connection systems. In the present embodiment, there are two busbar groups of a first busbar group including a first phase busbar 93A, second phase busbar 94A, and third phase busbar 95A, and a second busbar group including a first phase busbar 93B, second phase busbar 94B, and third phase busbar 95B.

Hereinafter, the connection system including the first busbar group may be referred to as connection system A, and the connection system including the second busbar group may be referred to as connection system B.

In the present application, a phrase such as structural elements of different connection systems indicates that different external power sources are electrically connected to the structural elements, and the power is supplied independently to each connection system. For example, if there are two connection systems A and B, there are two external power sources supplying the power to the motor 10, that is, the external power source electrically connected to the connection system A and the external power source electrically connected to the connection system B.

Two external power sources can independently supply the power to the motor 10. Even if one external power source supplying the power to one connection system fails to supply the power to the motor 10 for some reason, the other external power can supply the power to the other connection system. Thus, even if the power is not supplied to one connection system by a technical failure of the external power source or of a controller of the external power source, the motor 10 can be driven by supplying a current to the other connection system.

Figure 3:
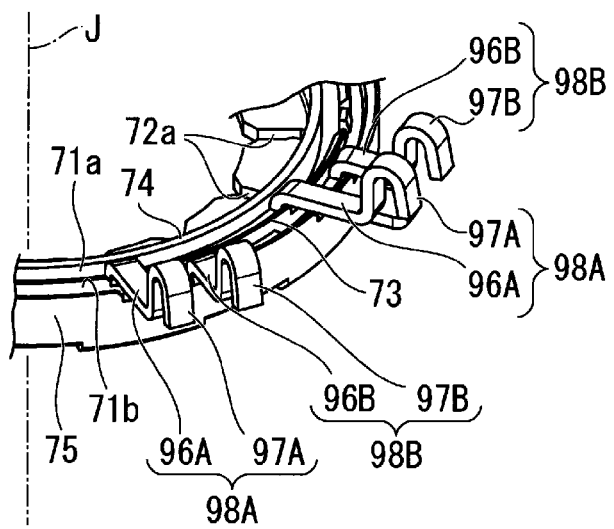
FIG. 3 is a perspective view of a lower side busbar assembly of the preferred embodiment.
Figure 3:
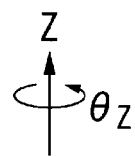

As shown in FIG. 3, the lower side busbar holder 71 includes a first coil support 72, lower side holder tube 73, inner side peripheral wall 74, and outer side peripheral wall 75.

Figure 4:
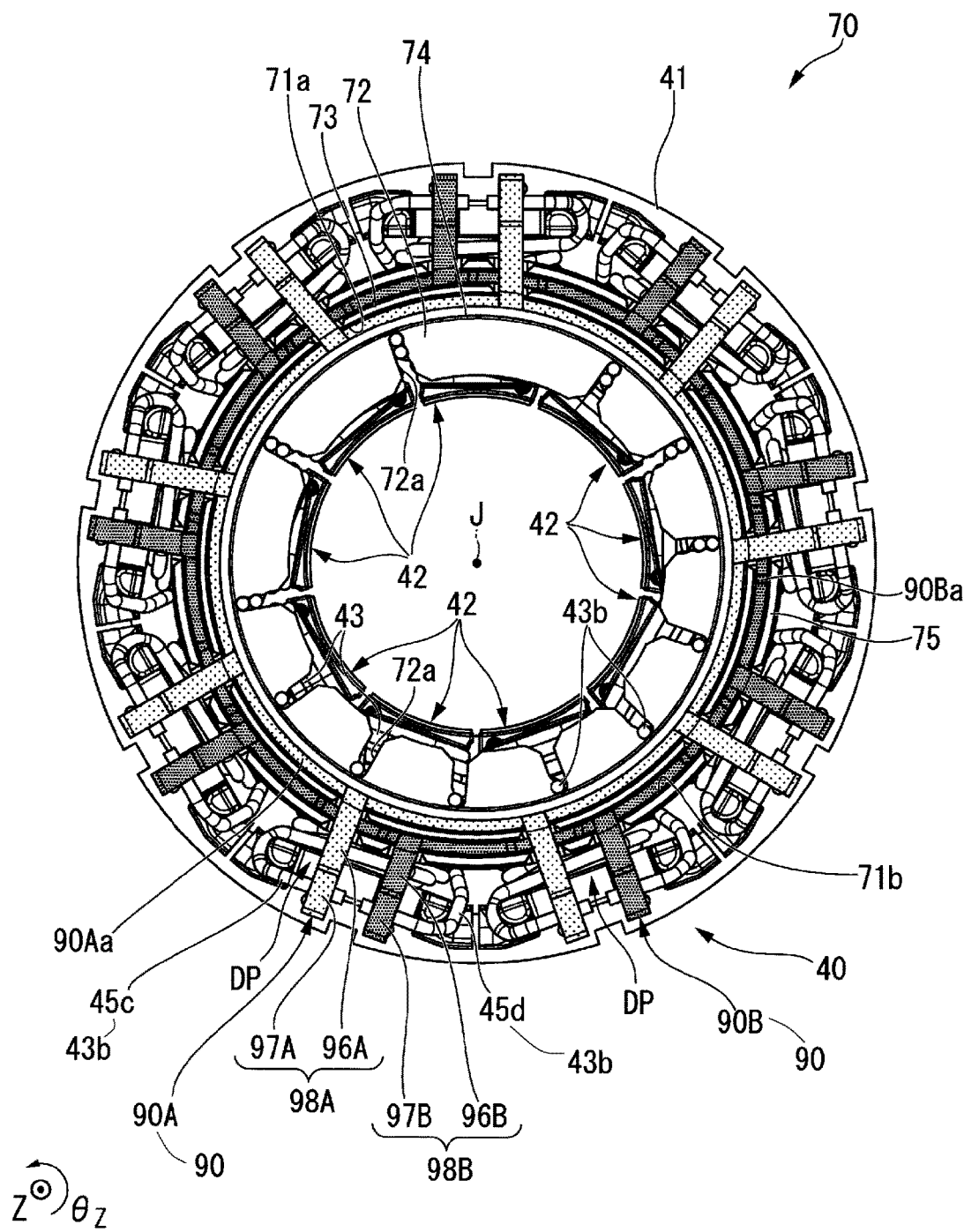
FIG. 4 is a plan view of the lower side busbar assembly of the preferred embodiment.

The first coil support 72 is a substantially cylindrical plate around the central axis J. As shown in FIG. 4, the first coil support 72 is disposed above the coil 43. The first coil support 72 includes a first supporter 72a supporting the coil end 43b. Thus, the conductive wire 43a of the coil 43 can be easily led while the insulation is maintained.

The first supporter 72a is a recess depressed from the inner edge of the first coil support 72 to the outer side thereof in the radial direction. The coil end 43b passes inside the first supporter 72a. The coil end 43b passing inside the first supporter 72a is supported by the inner side surface of the first supporter 72a from the both sides in the circumferential direction.

As shown in FIGS. 3 and 4, the lower side holder tube 73 is cylindrical around the central axis J. The lower side holder tube 73 extends from the first coil support 72 to the upper side. The inner side peripheral wall 74 and the outer side peripheral wall 75 are substantially annular extending in the circumferential direction. The inner side peripheral wall 74 is disposed inwardly than is the lower side holder tube 73 in the radial direction, and extends from the first coil support 72 to the upper side. The outer side peripheral wall 75 is disposed outwardly that is the lower side holder tube 73 in the radial direction, and extends from the first coil support 72 to the upper side.

The lower side busbar holder 71 includes a first lower side groove 71a and a second lower side groove 71b depressed downwardly and extending in the circumferential direction. The first lower side groove 71a is positioned between the lower side holder tube 73 and the inner side peripheral wall 74 in the radial direction. The second lower side groove 71b is positioned between the lower side holder tube 73 and the outer side peripheral wall 75 in the radial direction.

The neutral point busbar 90 includes a first busbar 90A and a second busbar 90B. As shown in FIG. 4, the first busbar 90A includes a first busbar body 90Aa extending in the circumferential direction and a first connection terminal 98A extending from the first busbar body 90Aa in the radial direction.

In a plan view, the first busbar body 90Aa is substantially annular. The first busbar body 90Aa is disposed in the first lower side groove 71a. The first busbar body 90Aa is fit in the first lower side groove 71a.

The first connection terminal 98A extends outwardly from the first busbar body 90Aa in the radial direction. In the present embodiment, the first busbar 90A includes nine first connection terminals 98A. The first connection terminals 98A are arranged at substantially regular intervals in the circumferential direction.

The first connection terminal 98A includes a first extension 96A and a first connector 97A. That is, the first busbar 90A includes the first extension 96A and the first connector 97A.

The first extension 96A extends from the first busbar body 90Aa in the radial direction. The first connector 97A is disposed in the end of the first extension 96A in the radial direction and is connected to the coil end 43b.

As shown in FIG. 3, the shape of the first connector 97A is a letter U. Thus, when the lower side busbar assembly 70 is disposed above the stator 40, the coil end 43b can be held by the first connector 97A. Thus, the first connector 97A and the coil end 43b can easily be connected.

The first connector 97A is shaped as a letter U opening to the lower side. Thus, when the lower side busbar assembly 70 is disposed above the stator 40, the coil end 43b can easily be grasped by the first connector 97A. Specifically, a lead line 45g which will be described later can easily be grasped by the first connector 97A. Thus, the first connector 97A can easily be disposed to the coil end 43b.

As shown in FIG. 4, the second busbar 90B includes a second busbar body 90Ba extending in the circumferential direction and a second connection terminal 98B extending from the second busbar body 90Ba in the radial direction.

In a plan view, the second busbar body 90Ba is substantially annular. The second busbar body 90Ba is disposed in the second lower side groove 71b. The second busbar body 90Ba is fit in the second lower side groove 71b.

The first busbar body 90Aa and the second busbar body 90Ba are disposed in the same position in the axis direction. The first busbar body 90Aa and the second busbar body 90Ba overlap with each other in the radial direction.

The second connection terminal 98B extends outwardly from the second busbar body 90Ba in the radial direction. In the present embodiment, the second busbar 90B includes nine second connection terminals 98B. The second connection terminals 98B are arranged at substantially regular intervals in the circumferential direction.

The second connection terminal 98B includes a second extension 96B and a second connector 97B. That is, the second busbar 90B includes the second extension 96B and the second connector 97B.

The second extension 96B extends from the second busbar body 90Ba in the radial direction. The second connector 97B is disposed in the end of the second extension 96B in the radial direction, and is connected to the coil end 43b. The shape of the second connector 97B is the same with the shape of the first connector 97A.

The first connector 97A and the second connector 97B are disposed in the same position in the axis direction, for example. Thus, the connectors and the coil end 43b can be connected at the same position in the axis direction. Thus, a process of connecting the first busbar 90A, second busbar 90B, and coil end 43b can easily be performed.

Figure 5:
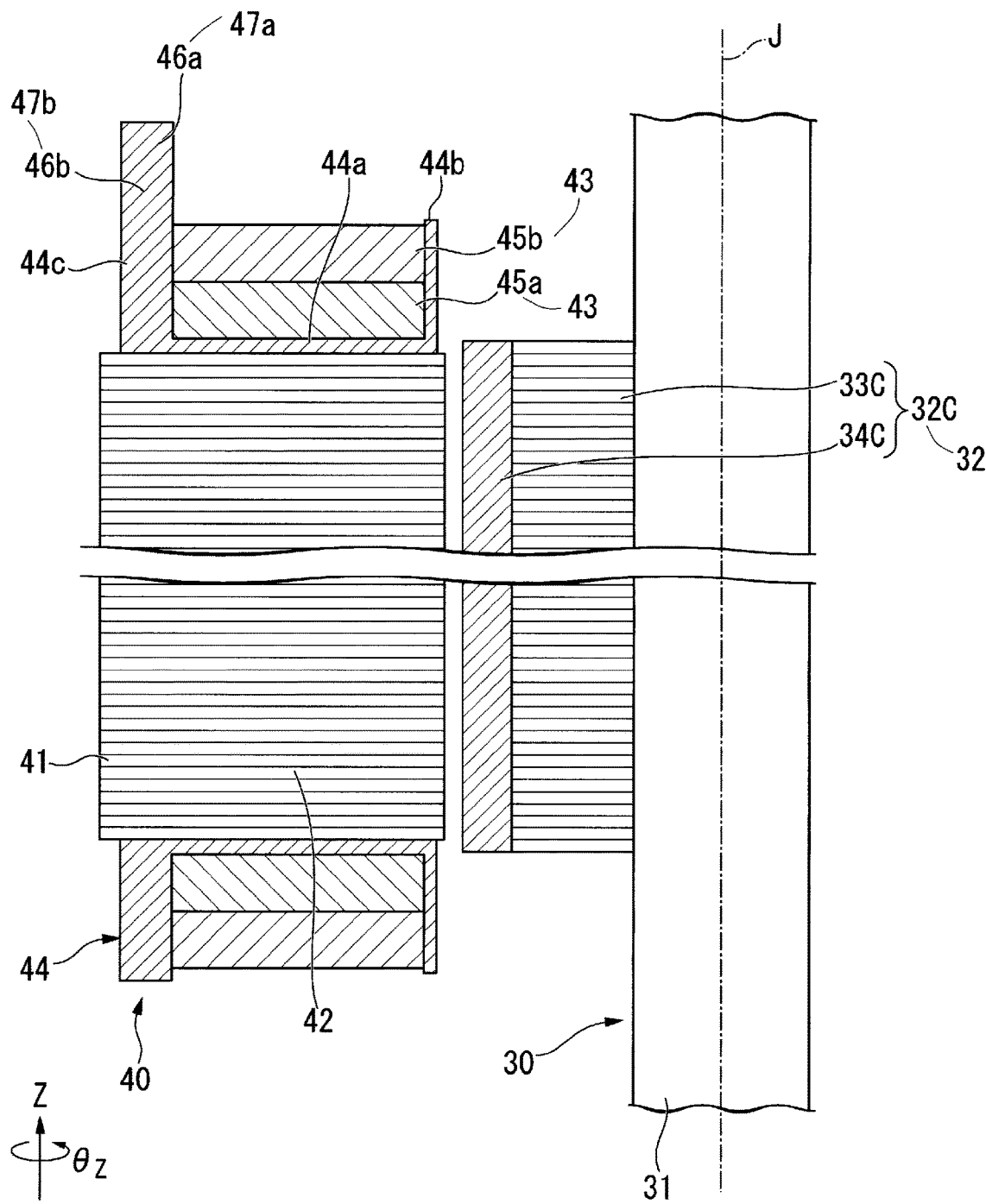
FIG. 5 is a cross-sectional view of part of the stator of the preferred embodiment.

As shown in FIG. 5, the insulator 44 includes an insulator tube 44a, inner side plate 44b, outer side plate 44c, first base 46b, second base 47b, first protrusion 46a, and second protrusion 47a.

The insulator tube 44a is annular and surrounds the teeth 42 in the both sides in the axis direction and the both sides in the circumferential direction. The insulator tube 44a is, for example, a rectangular tube-like shape in the radial direction.

The inner side plate 44b is a plate extending from the inner end of the insulator tube 44a in the radial direction to the both sides in the axis direction and the both sides in the circumferential direction. The outer side plate 44c is a plate extending from the outer end of the insulator tube 44a in the radial direction to the both sides in the axis direction and the both sides in the circumferential direction.

Figure 6:
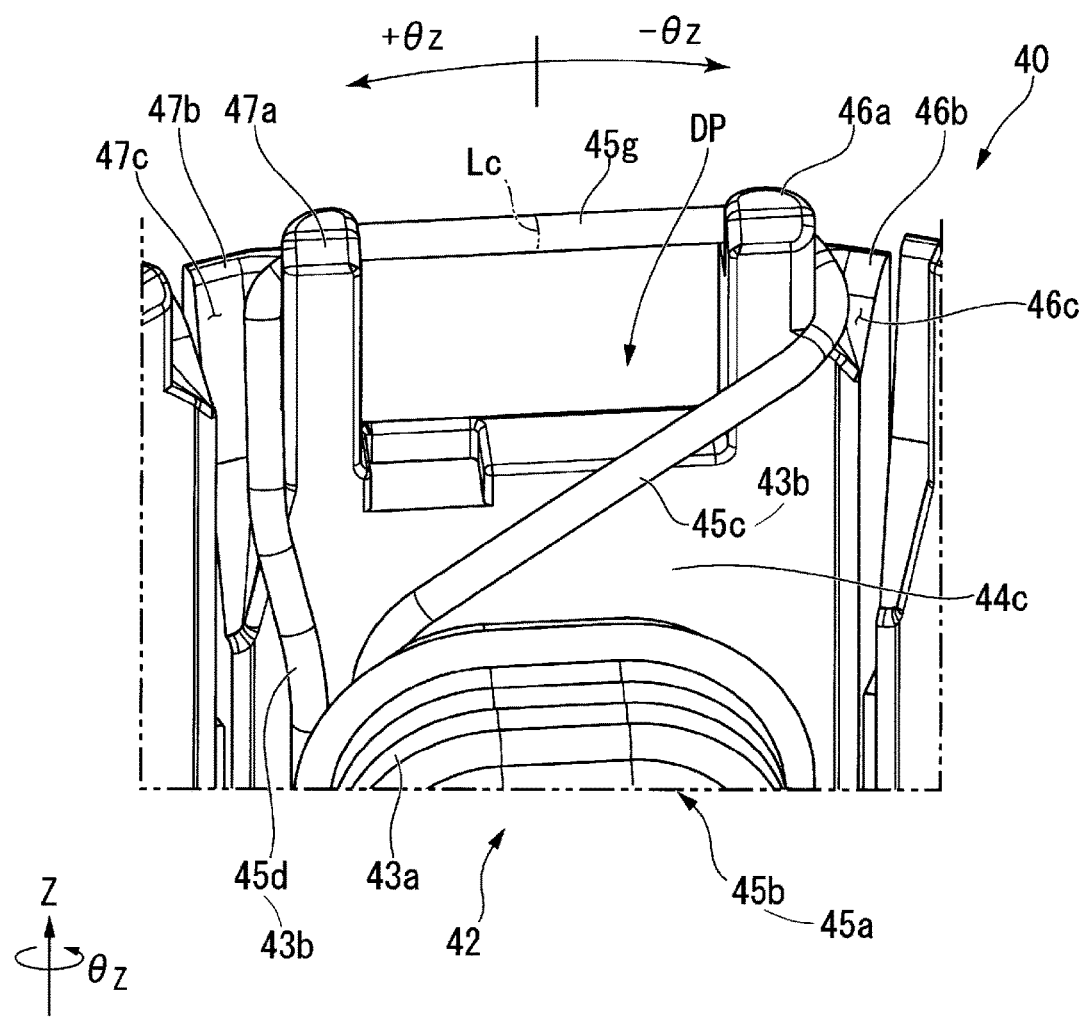
FIG. 6 is a perspective view of part of the stator of the preferred embodiment.
Figure 7:
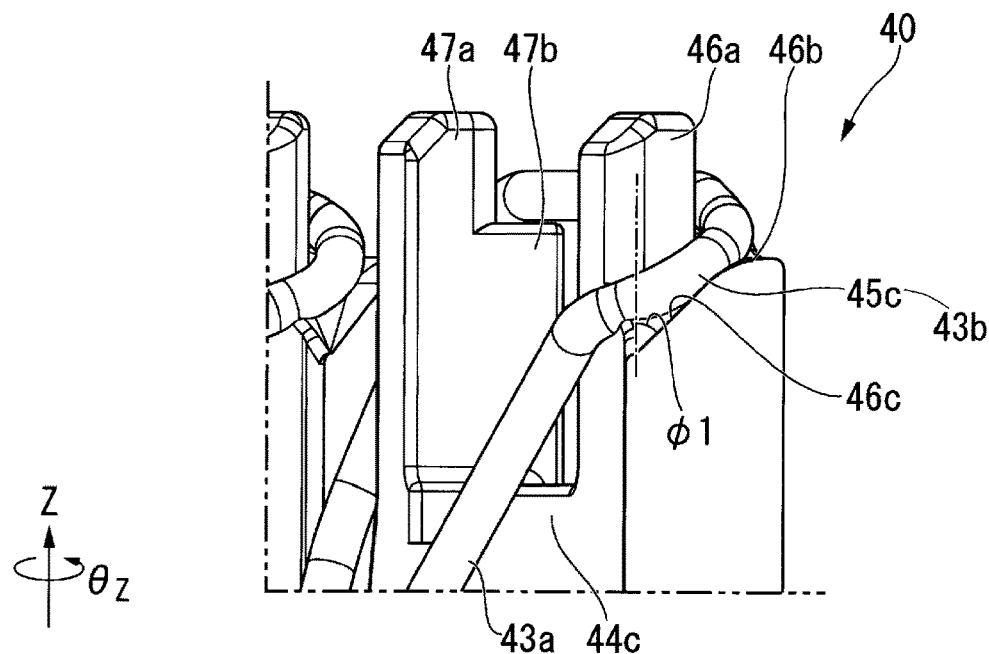
FIG. 7 is a perspective view of part of the stator of the preferred embodiment.
Figure 8:
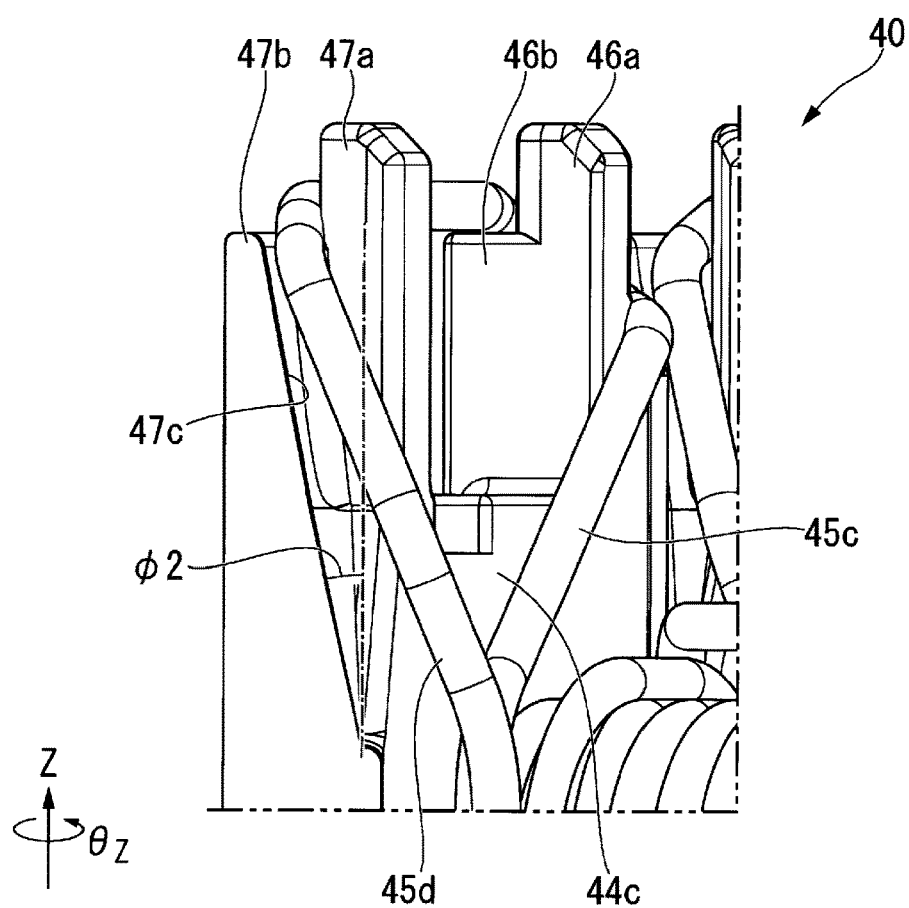
FIG. 8 is a perspective view of part of the stator of the preferred embodiment.

As shown in FIGS. 6 to 8, the first base 46b and the second base 47b are each a substantially quadrangular prism. As shown in FIG. 6, the first base 46b is disposed in the upper side end of the outer side plate 44c in one side in the circumferential direction. The first base 46b is disposed closer to the one side of the circumferential direction than are the teeth 42.

The second base 47b is disposed in the upper side end of the outer side plate 44c in the other side of the circumferential direction. The second base 47b is disposed closer to the other side in the circumferential direction that are the teeth 42. As shown in FIG. 5, the first base 46b and the second base 47b are disposed above the core back 41. Note that the first base 46b and the second base 47b may be disposed to overlap with the teeth 42 in the axis direction.

As shown in FIG. 6, the first protrusion 46a protrudes from the first base 46b to the upper side. The first protrusion 46a is a substantially quadrangular prism. The first protrusion 46a is, in the upper end of the first base 46b, disposed in the inner side end thereof in the radial direction and in the end thereof in the second base 47b side in the circumferential direction.

The second protrusion 47a protrudes from the second base 47b to the upper side. The second protrusion 47a and the first protrusion 46a are disposed in the circumferential direction with a gap DP therebetween. The second protrusion 47a is a substantially quadrangular prism. The second protrusion 47a is, in the upper end of the second base 47b, disposed in the inner side end thereof in the radial direction and in the end thereof in the first base 46b side in the circumferential direction.

The first base 46b includes a first inclined surface 46c. The first inclined surface 46c is disposed in the first protrusion 46a in the side opposite to the second protraction 47a in the circumferential direction. A distance between the first inclined surface 46c and the central axis J increases toward the upper side in the radial direction.

The second base 47b includes a second inclined surface 47c. The second inclined surface 47c is disposed in the second protrusion 47a in the side opposite to the first protrusion 46a in the circumferential direction. A distance between the second inclined surface 47c and the central axis J increases toward the upper side in the radial direction.

Inclination φ2 of the second inclined surface 47c with respect to the axis direction shown in FIG. 8 is less than inclination φ1 of the first inclined surface 46c with respect to the axis direction shown in FIG. 7.

The coils 43 form a plurality of connection systems. Specifically, the coils 43 form two connection systems. That is, the first coil group including the coils 43 and the second coil group including the coils are formed wherein the connection systems of the first coil group and the second coil group are different.

The first busbar 90A and the first busbar group are electrically connected to the first coil group. The second busbar 90B and the second busbar group are electrically connected to the second coil group.

The first coil group and the first busbar 90A are included in the connection system A. The second coil group and the second busbar 90B are included in the connection system B.

Two coils 43 are disposed in each of the teeth 42 with the insulator 44 therebetween. The coils 43 include a first coil 45a and a second coil 45b. The first coil 45a is disposed in the teeth 42 with the insulator 44 therebetween. The second coil 45b is disposed in the teeth 42 with the first coil 45a and the insulator 44 therebetween. That is, the second coil 45b surrounds the first coil 45a in the both sides in the axis direction and the both sides in the circumferential direction.

If the first coil 45a and the second coil 45b are formed in the teeth 42, the conductive wire is wound around the teeth 42 to form the first coil 45a, and then, the conductive wire is wound over the first coil 45a to form the second coil 45b. That is, a winding end of the first coil 45a and a winding start of the second coil 45b cannot be provided at the same time. Thus, as compared to a case where two conductive wires are wound at the same time, the coil end 43b of the first coil 45a and the coil end 43b of the second coil 45b can easily be recognized by an operator or the like. Thus, confusion of the coil ends 43b connected to the neutral point busbar 90 by an operator or the like can be suppressed. As a result, each first coil 45a and each second coil 45b can suitably be connected to the neutral point busbar 90, and the connection systems can be formed easily and more securely.

As shown in FIG. 6, the first coil end 45c which is the coil end 43b of the first coil 45a contacts the first protrusion 46a. The second coil end 45d which is the coil end 43b of the second coil 45b contacts the second protrusion 47a. That is, when the first coil 45a and the second coil 45b are formed, the conductive wire 43a wound around the teeth 42 can be hooked onto the first protrusion 46a and the second protrusion 47a. Thus, the confusion of the first coil end 45c and the second coil end 45d by an operator or the like can further be suppressed.

The first coil end 45c is hooked onto the first protrusion 46a. The second coil end 45d is hooked onto the second protrusion 47a. At that time, the first coil end 45c is guided along the first inclined surface 46c. The second coil end 45d is guided along the second inclined surface 47c. Thus, the first coil end 45c and the second coil end 45d can easily be drawn by hooking them onto the first protrusion 46a and the second protrusion 47a.

The first coil end 45c is a winding end line of the first coil 45a. The second coil end 45d is a winding start line of the second coil 45b. The first coil end 45c and the second coil end 45d extend from the teeth 42 in the other side of the circumferential direction. That is, the first coil end 45c and the second coil end 45d extend from the same side of teeth 42 in the circumferential direction.

Thus, an angle formed by the first coil end 45c extending from the teeth 42 to the first protrusion 46a with respect to the axis direction, and an angle formed by the second coil end 45d extending from the teeth 42 to the second protrusion 47a with respect to the axis direction are different from each other.

Specifically, in FIG. 6, the first coil end 45c is drawn from the other side of the teeth 42 in the circumferential direction, and is hooked onto the first protrusion 46a in the one side in the circumferential direction. On the other hand, the second coil end 45d is hooked onto the second protrusion 47a in the other side in the circumferential direction, and extends in the other side of the teeth 42 in the circumferential direction. Thus, the inclination of the first coil end 45c with respect to the axis direction is relatively greater than the inclination of the second coil end 45d with respect to the axis direction.

As described above, the inclination $\varphi 2$ of the second inclined surface 47c is less than the inclination $\varphi 1$ of the first inclined surface 46c. Since the first coil end 45c inclination of which with respect to the axis direction is relatively great can be disposed along the first inclined surface 46c inclination of which is relatively great, the first coil end 45c can easily be guided in the manufacturing process of the motor. Since the second coil end 45d inclination of which with respect to the axis direction is relatively small can be disposed along the second inclined surface 47c inclination of which is relatively small, the second coil end 45d can easily be guided in the manufacturing process of the motor. Thus, the first coil end 45c and the second coil end 45d can easily be drawn by hooking them onto the first protrusion 46a and the second protrusion 47a. The first coil 45a and the second coil 45b wound around each of the teeth 42 included in either the first coil group or the second coil group having different connection systems. In each of the teeth 42, in the preferred embodiment, coil groups of the first coil 45a and the second coil 45b are different from each other.

As shown in FIG. 4, the first connector 97A, second connector 97B, first coil end 45c, and second coil end 45d are connected by, for example, welding.

The connection point of the first connector 97A and the second connector 97B and the connection point of the first coil end 45c and the second coil end 45d overlap with the gap DP in the radial direction. That is, the connection point between the first busbar 90A and second busbar 90B and the coil end 43b overlaps with the gap DP in the radial direction. Thus, with the gap DP, a space to connect the coil end 43b to the first busbar 90A and the second busbar 90B can be secured. Thus, the connection of the coil end 43b, first busbar 90A, and second busbar 90B can easily be performed by, for example, welding.

Note that the first coil 45a and the second coil 45b may be formed of one continuous conductive wire 43a. In that case, by connecting one of the first connectors 97A and 97B to a lead line 45g (as shown in FIG. 6), two coil ends 43b (that is, both of the first coil end 45c and the second coil end 45d) can be connected to the neutral point busbar 90. Thus, the number of attachment processes such as welding in the manufacturing process of the motor can be reduced half. Thus, a work load in the attachment process of the coil end 43b and the neutral point busbar 90 can be reduced.

Figure 9A:
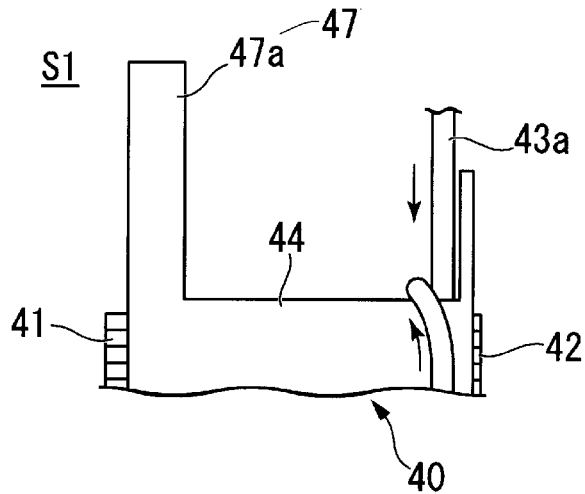
FIGS. 9A, 9B, and 9C show parts of a manufacturing method of a motor of the preferred embodiment.
Figure 10A:
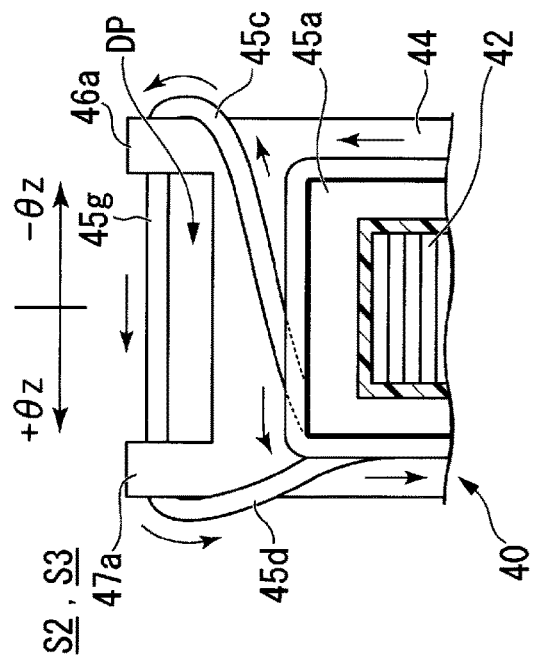
FIGS. 10A, 10B, 10C, and 10D show parts of the manufacturing method of the motor of the preferred embodiment.

As shown in FIGS. 9A and 10A, a first coil forming step S1 is a step of forming the first coil 45a by winding the conductive wire 43a around the teeth 42. In the first coil forming step S1, the conductive wire 43a is, for example, wound from the inner end of the teeth 42 in the radial direction with the insulator 44 therebetween.

Figure 9B:
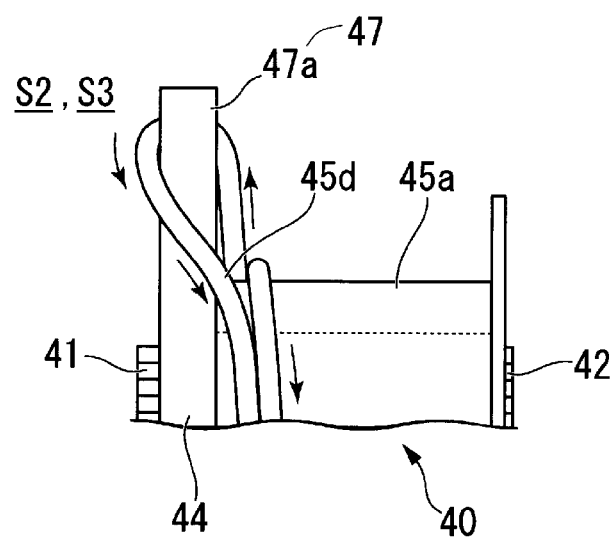
Figure 10B:
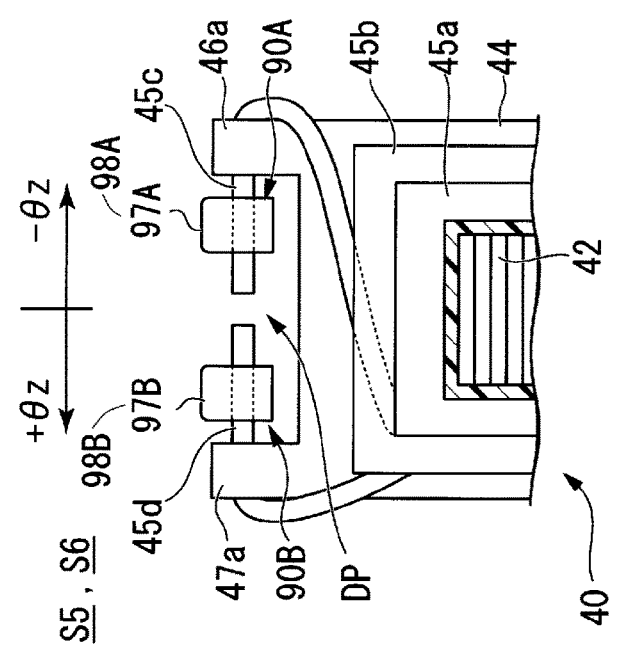

As shown in FIGS. 9B and 10B, the first coil 45a is formed in the first coil forming step S1. In the first coil forming step S1, a winding end position of the first coil 45a is in the teeth 42 in the other side in the circumferential direction.

A lead line forming step S2 is a step of hooking the conductive wire 43a which is the winding end of the first coil 45a onto the insulator 44 to form a lead line 45g. The winding end of the first coil 45a which is the first coil end 45c extending from the other side of the teeth 42 in the circumferential direction is drawn to the one side of the circumferential direction and hooked onto the first protrusion 46a.

Then, the conductive wire 43a is drawn to the second protrusion 47a along the outer side of the first protrusion 46a in the radial direction to be hooked onto the second protrusion 47a. In other words, in the lead line forming step S2, the winding end of the first coil 45a is hooked onto the first protrusion 46a and then onto the second protrusion 47a.

As described above, the lead line 45*g* is formed as shown in FIG. 10B. That is, in the lead line forming step S2, the conductive wire 45*a* is hooked onto the first protrusion 46*a* and the second protrusion 47*a*, and the lead line 45*g* is formed in a position overlapping the gap DP in the radial direction.

A second coil forming step S3 is a step of winding the conductive wire 43*a* which is the first coil 45*a* and the lead line 45*g* over the first coil 45*a* to form the second coil 45*b*. In the second coil forming step S3, a winding start position of the second coil 45*b* is in the other side of the teeth 42 in the circumferential direction.

For example, if the drawing direction of the conductive wire 43*a* is reversed in the formation of the lead line 45*g*, the conductive wire 43*a* hooked onto the second protrusion 47*a* and the first protrusion 46*a* in this order is drawn to diagonally downward from the one side to the other side in the circumferential direction. In that case, since the conductive wire 43*a* is drawn diagonally from the upper side to the lower side, the wire 43*a* tends to expand in the upper side. Thus, the conductive wire 43*a* tends to be loose.

In consideration of this point, in the preferred embodiment, the winding end of the first coil 45*a* is initially hooked onto the first protrusion 46*a* in the lead line forming step S2. Thus, the winding end of the first coil 45*a* drawn from the other side of the teeth 42 in the circumferential direction is drawn diagonally upward from the other side to the one side in the circumferential direction. Thus, the conductive wire 43*a* diagonally drawn does not easily expand in the upper side, and the conductive wire 43*a* can be prevented from becoming loose.

As shown in FIG. 9B, in the second coil forming step S3, the conductive wire 43*a* is wound from the outer end of the teeth 42 in the radial direction with the insulator 44 and the first coil 45*a* therebetween. In the second coil forming step S3, the second coil 45*b* is formed (cf. FIGS. 9C and 10C).

Figure 9C:
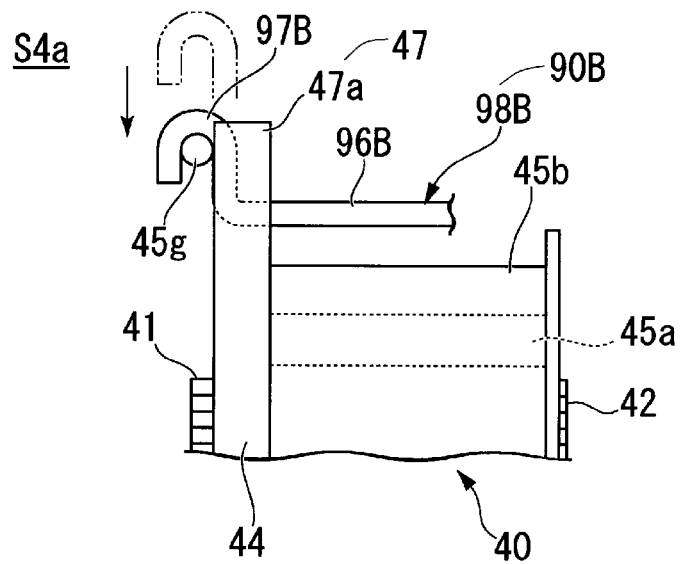
Figure 10C:
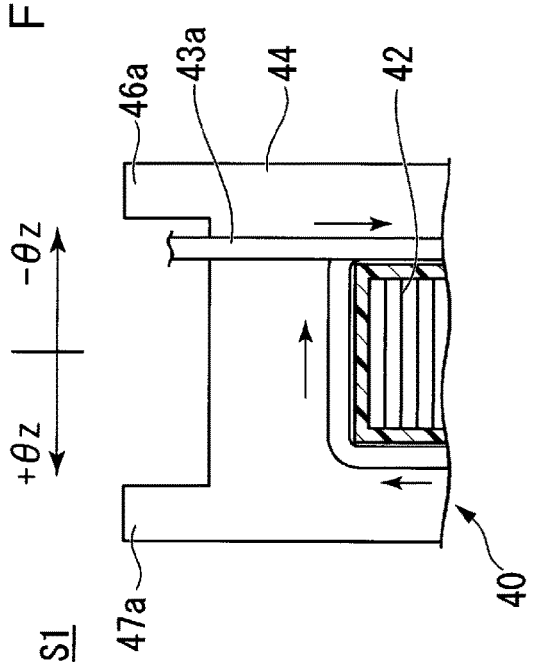

As shown in FIGS. 9C and 10C, an arrangement step S4 is a step of arranging the first busbar 90A and the second busbar 90B in the lead line 45*g*. The first busbar 90A and the second busbar 90B are brought in from the upper side of the stator 40, and the lead line 45*g* can be held by the first connector 97A and the second connector 97B of letter U shape.

Figure 10D:
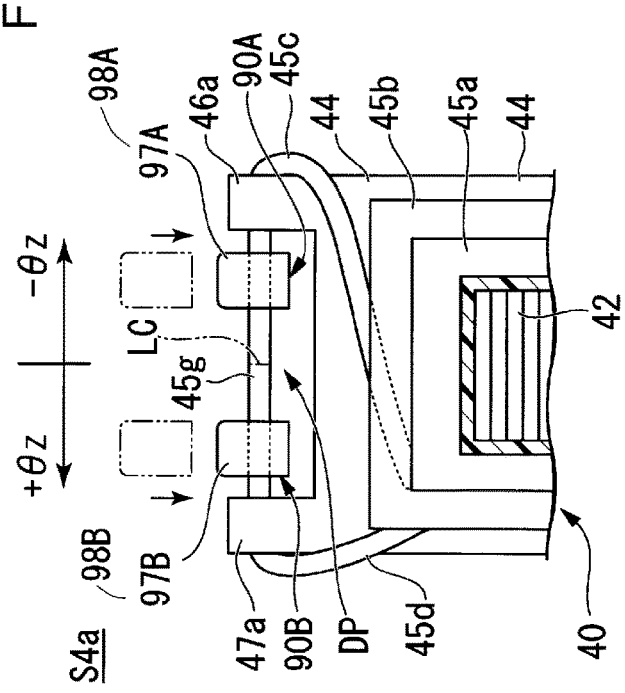

A cutting step S5 is a step of cutting the lead line 45*g* between the position where the first busbar 90A is disposed and the position where the second busbar 90B is disposed. For example, the lead line 45*g* is cut along a cut line Lc. Thus, as shown in FIG. 10D, the first coil end 45*c* and the second coil end 45*d* can be separated.

A connecting step S6 is a step of connecting the first busbar 90A and the second busbar 90B to the lead line 45*g* cut as above. Specifically, the first connector 97A is connected to the first coil end 45*c*, and the second connector 97B is connected to the second coil end 45*d*. Thus, two neutral point busbars 90 of different connection system are connected to the first coil 45*a* and the second coil 45*b*, respectively. The first connector 97A and the second connector 97B are connected to the first coil end 45*c* and the second coil end 45*d*, respectively, by welding or the like.

Through the above steps, two coils 43 are connected to the neutral point busbars 90 of two different connection systems. Thus, two connection systems A and B can be formed while the confusion of coil ends 43*b* to be connected to the neutral point busbars 90 by an operator or the like is suppressed.

A step of connecting one of the the first busbar 90A and the second busbar 90B to the lead line 45*g* may be added to the above steps. In that case, the step is performed as in the arrangement step S4 except that the neutral point busbar 90 connected to the lead line 45*g* is one of the first busbar 90A and the second busbar 90B.

The invention of the present disclosure is not limited to the above-described preferred embodiment, and other structures can be adopted. In the following description, structural elements similar to those explained above will be referred to by the same reference numbers, and explanation considered redundant will be omitted.

The first coil end 45*c* may be connected to one of the first busbar 90A and the second busbar 90B, and the second coil end 45*d* may be connected to the other. That is, the first coil end 45*c* may be connected to the second busbar 90B, and the second coil end 45*d* may be connected to the first busbar 90A. Furthermore, the neutral point busbars 90 connected to the first coil end 45*c* and the second coil end 45*d* may be different in each of the teeth 42.

As long as the first coil 45*a* and the second coil 45*b* are wound around at least one of the teeth 42, there may be one or more coils 43 that are wound around some other teeth 42, for example.

Figure 11:
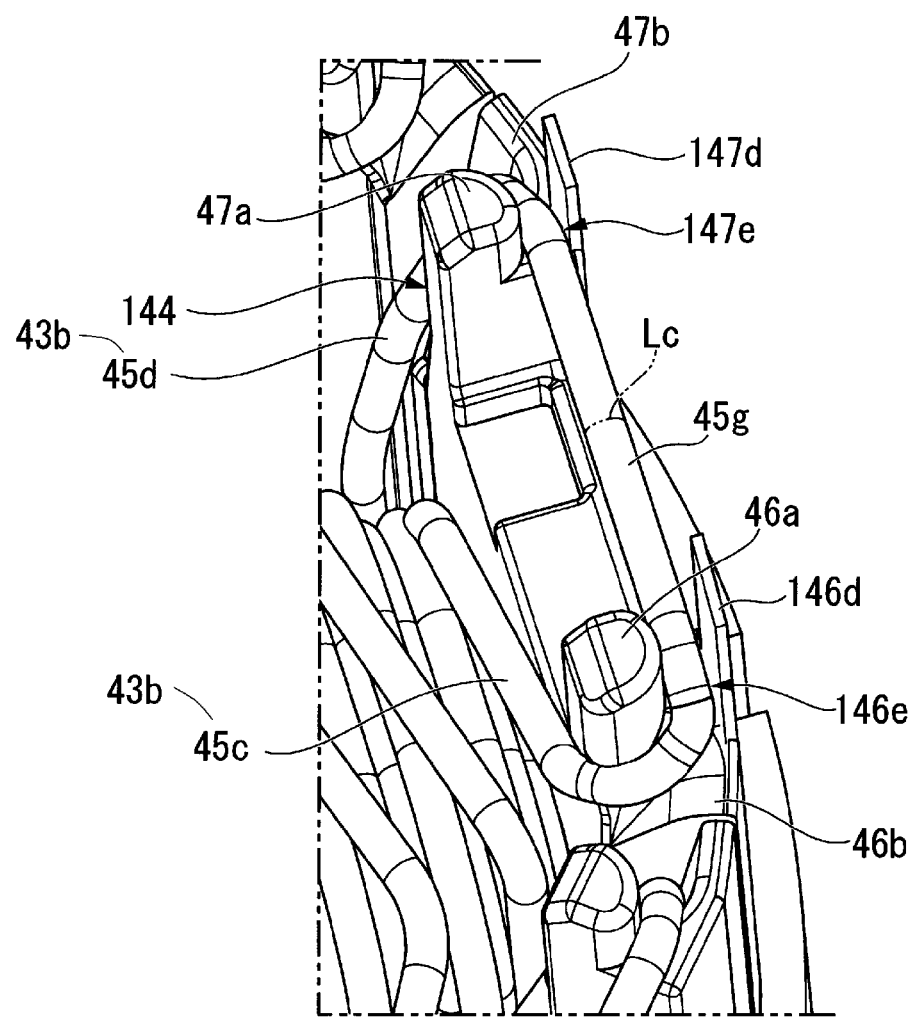
FIG. 11 is a perspective view of another example of an insulator of the preferred embodiment.

The insulator 44 may be formed as in FIG. 11. As shown in FIG. 11, an insulator 144 includes a first wall 146*d* and a second wall 147*d*.

The first wall 146*d* extends from the first base 46*b* to the upper side. The first wall 146*d* is, for example, a plate surface of which is orthogonal to the radial direction. The first wall 146*d* is opposed to the first protrusion 46*a* in the radial direction with a gap therebetween. The first protrusion 46*a* and the first wall 146*d* form a first holder 146*e*.

The second wall 147*d* extends from the second base 47*b* to the upper side. The second wall 147*d* is, for example, a plate surface of which is orthogonal to the radial direction. The second wall 147*d* is opposed to the second protrusion 47*a* in the radial direction with a gap therebetween. The second protrusion 47*a* and the second wall 147*d* form a second holder 147*e*.

The coil ends 43*b* are held by the first holder 146*e* and the second holder 147*e*. That is, the coil ends 43*b* are held in a gap between the first wall 146*d* and the first protrusion 46*a* in the radial direction and a gap between the second wall 147*d* and the second protrusion 47*a* in the radial direction, respectively. Thus, when the lead line 45*g* is formed by drawing the coil end 43*b*, the coil end 43*b* can easily be drawn without getting loose.

With the above structure, a strong force to pull the coil ends 43*b* is not necessary to draw the coil ends 43*b* without getting loose, and a force applied inwardly in the radial direction to the first protrusion 46*a* and the second protrusion 47*a* by the coil end 43*b* can be reduced. Thus, a position shift of the insulator 144 caused by a strong force applied to the first protrusion 46*a* and the second protrusion 47*a* can be suppressed, and deformation of the first protrusion 46*a* and the second protrusion 47*a* can be suppressed.

The structures of the first base 46*b* and the second base 47*b* are not limited. For example, the first base 46*b* and the second base 47*b* may not protrude. For example, the outer side plate 44*c* may function as a base.

The number of rotor core in the rotor 30 may be one. The motor 10 may be, for example, an outer rotor motor.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a rotor including a shaft disposed along a central axis extending in a vertical direction; and
   a stator opposed to the rotor in a radial direction with a gap therebetween, wherein the stator includes:
      an annular core back extending in a circumferential direction;
      a plurality of teeth extending from the core back in the radial direction;
      a plurality of coils formed of a conductive wire, each of the plurality of coils wound around a respective one of the teeth, the coils forming a plurality of connection systems;
      an insulator, at least part of which is positioned between the teeth and the coils, and
      wherein each of the coils includes:
         a first coil wound around the respective one of the teeth via the insulator; and
         a second coil wound around the respective one of the teeth via the first coil and the insulator;
      a winding start line of each of the first coils extending from a first side of the respective one of the teeth in the circumferential direction;
      a winding end line of each of the first coils drawn from a second side of the respective one of the teeth in the circumferential direction, the first side of the teeth being opposite to the second side of the respective one of the teeth; and
      a winding start line of each of the second coils drawn from the second side of the respective one of the teeth in the circumferential direction;
   wherein the winding end line of each of the first coils is held by a first connector and the winding start line of each of the second coils is held by a second connector, and
   wherein for each of the coils, the winding end line of the first coil and the winding start line of the second coil face each other.

2. The motor of claim 1, further comprising,
   a plurality of busbars electrically connected to the stator,
   wherein the coil includes a coil end connected to the busbar, and
   wherein a first coil group including the coils, and a second coil group including the coils and having different connection systems than the first coil group, are formed, and
   wherein the busbars include,
   a first busbar electrically connected to the first coil group, and
   a second busbar electrically connected to the second coil group, and
      wherein, in at least one of the teeth, the coil end of the first coil is connected to one of the first busbar and the second busbar, and
      wherein the coil end of the second coil is connected to the other of the first busbar and the second busbar.

3. The motor of claim 2, wherein, in at least one of the teeth, the coil end of the first coil and the coil end of the second coil are connected to one of the first busbar and the second busbar.

4. The motor of claim 3, wherein, in at least one of the teeth, the first coil and the second coil are formed of the conductive wire which has a single continuous structure.

5. The motor of claim 2, wherein the insulator includes,
   a base disposed above the core back,
   a first protrusion protruding toward an upper side from the base, and
   a second protrusion protruding toward the upper side from the base, the first protrusion and the second protrusion disposed in the circumferential direction with a gap therebetween, and
   wherein the coil end of the first coil contacts the first protrusion, and
   wherein the coil end of the second coil contacts the second protrusion.

6. The motor of claim 5, wherein a connection point of the first busbar, the second busbar, and the coil end overlaps the gap in the radial direction.

7. The motor of claim 5, wherein the base includes,
   a first inclined surface disposed at opposite side to the second protrusion in the circumferential direction of the first protrusion, where a distance between the first inclined surface and the central axis in the radial direction increases toward the upper side, and
   a second inclined surface disposed at opposite side to the first protrusion in the circumferential direction of the second protrusion where a distance between the second inclined surface and the central axis in the radial direction increases toward the upper side.

8. The motor of claim 7, wherein the coil end of the first coil and the coil end of the second coil extend from the same side of the teeth in the circumferential direction, and inclination of the second inclined surface with respect to the axis direction is less than inclination of the first inclined surface with respect to the axis direction.

9. The motor of claim 5, wherein the insulator includes,
   a first wall extending from the base toward the upper side, the first wall being opposed to the first protrusion in the radial direction with a gap therebetween, and
   a second wall extending from the base toward the upper side, the second wall being opposed to the second protrusion in the radial direction with a gap therebetween, and
   wherein the coil ends are held in the gap between the first wall and the first protrusion in the radial direction and the gap between the second wall and the second protrusion in the radial direction.

10. The motor of claim 2, wherein the busbar includes a busbar body extending in the circumferential direction, an extension extending from the busbar body in the radial direction, and a connector disposed in the end of the extension in the radial direction to be connected to the coil end, and wherein
    a shape of the connector is U-shaped.

11. The motor of claim 10, wherein the connector is U-shaped opening downward.

12. The motor of claim 2, further comprising an insulative busbar holder holding the busbar, wherein
    the busbar holder includes a first coil support including a first supporter which holds the coil end.

13. The motor of claim 2, further comprising:
    a terminal connected to a power source; and
    an insulative second coil support including a second supporter which holds the coil end, wherein
    the busbar includes a phase busbar connected to the terminal and a neutral point busbar connecting the coil ends as a neutral point, and
    the second coil support is disposed between the neutral point busbar and the phase busbar in an axis direction.

14. The motor of claim 1, wherein the winding end line of the first coil and the winding start line of the second coil face each other through a gap.

15. A stator unit comprising a motor including a rotor with a shaft disposed along a central axis extending in a vertical direction, the stator unit comprising:
   a stator opposed to the rotor in a radial direction with a gap therebetween; and
   a plurality of busbars electrically connected to the stator, wherein the stator includes:
      an annular core back extending in a circumferential direction;
      a plurality of teeth extending from the core back in the radial direction;
      a plurality of coils formed of a conductive wire, each of the plurality of coils wound around a respective one of the teeth, the coils forming a plurality of connection systems;
      an insulator, at least part of which is positioned between the teeth and the coils, and
   wherein each of the coils includes:
      a first coil including a coil end connected to the busbar and wound around the respective one of the teeth via the insulator; and
      a second coil including a coil end connected to the busbar and wound around the respective one of the teeth via the first coil and the insulator;
   a winding start line of each of the first coils extending from a first side of the respective one of the teeth in the circumferential direction;
   a winding end line of each of the first coils drawn from a second side of the respective one of the teeth in the circumferential direction, the first side of the teeth being opposite to the second side of the respective one of the teeth; and
   a winding start line of each of the second coils drawn from the second side of the respective one of the teeth in the circumferential direction;
   wherein the winding end line of each of the first coils is held by a first connector and the winding start line of each of the second coils is held by a second connector, and
   wherein for each of the coils, the winding end line of the first coil and the winding start line of the second coil face each other.

* * * * *

UNITED STATES PATENT AND TRADEMARK OFFICE
CERTIFICATE OF CORRECTION

PATENT NO. : 10,651,701 B2
APPLICATION NO. : 15/751490
DATED : May 12, 2020
INVENTOR(S) : Yu Asahi et al.

Page 1 of 1

It is certified that error appears in the above-identified patent and that said Letters Patent is hereby corrected as shown below:

In the Specification

Column 11, Line 65: change 'the the' to -- the --

Signed and Sealed this
Twenty-second Day of December, 2020

Andrei Iancu
*Director of the United States Patent and Trademark Office*